March 4, 1952 — A. HAHN — 2,588,321
PICTURE ART SET
Filed May 19, 1950
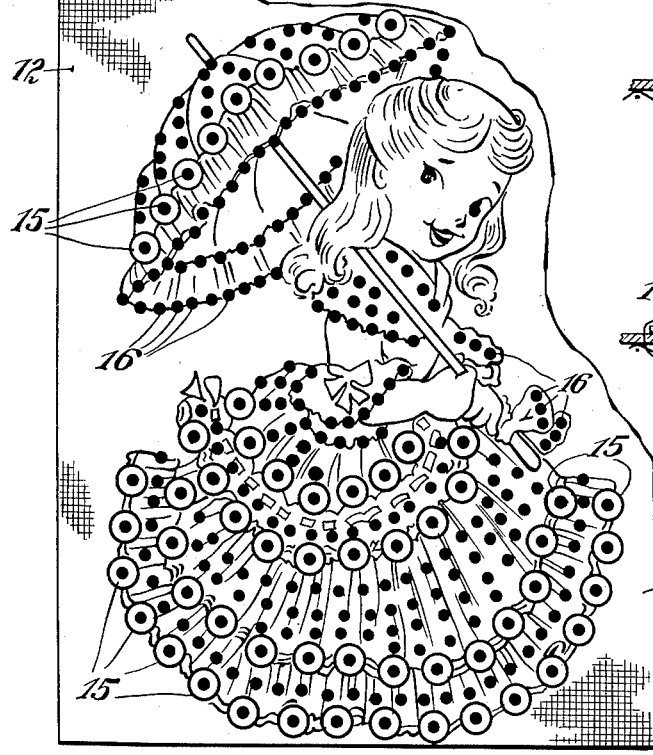
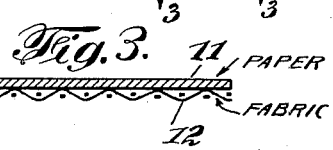
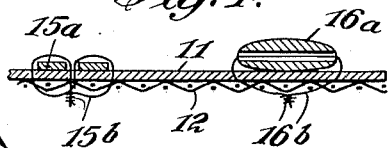
INVENTOR.
Alfred Hahn
BY C. P. Goepel
his ATTORNEY Patented Mar. 4, 1952

2,588,321

UNITED STATES PATENT OFFICE 2,588,321

PICTURE ART SET

Alfred Hahn, Forest Hills, N. Y., assignor to Union Novelty Company, Inc., New York, N. Y., a corporation of New York Application May 19, 1950, Serial No. 162,886

1 Claim. (Cl. 35—1)

This invention relates to art pictures with ornaments thereon, wherein an initial picture of artistic finish, preferably in colors, is presented to the vision of child, which is taught by a registering picture at the rear of the card to apply real sequins and beads as diagrammatically indicated in the rear picture, preferably in black on the white card, to the front of the picture at the corresponding points of the front picture.

The result of this transposition enhances the artistic character of the front picture when completed with the sequins and beads, and entices a child to continue its occupation under simultaneous educational instruction, with similar pictures.

The invention consists in a picture card representing in replica a pleasing picture, and on the rear of that picture, a skeleton duplicate of that picture in outline to indicate the proper positions of the sequins and beads and having such sequin and bead indications thereon, to enable the child to place the real sequins and beads on the front of the picture.

The invention will be more fully described hereinafter, embodiments thereof shown in the drawings, and the invention will be finally pointed out in the claim.

In the accompanying drawings,

Fig. 1 is a front view showing the artistic picture to which real sequins and beads are to be applied;

Fig. 2 is a rear view of that picture in skeleton outline, showing the sequin and bead indications;

Fig. 3 is a section on line 3—3 of Fig. 1, showing the paper front and the fabric back of the card; and Fig. 4 is such a section with the actual sequin and bead applied to the card by stitching.

Similar characters of reference indicate corresponding parts throughout the various views.

Referring to the drawings, the front of the card 10, is made of paper sheet 11 suitable to receive printing or lithographing matter of the better kind, and preferably of the type having a glaze, like the magazine covers of Life, etc. Compressed to and forming an integral part of the front paper layer 11, is a layer 12 of fabric of a fine mesh type, which adds a certain rigidity to the front layer 11 of paper, so that this card 10 can be easily manipulated, without folding or objectionable creasing.

Upon the front paper sheet 11, there is printed and lithographed in colors, the picture 13 of a young girl with a modern or antique dress, and preferably with an umbrella 14. This, of course, is only an example of the many pictures which may be used. The preferred coloring effect makes the front sheet of paper very attractive to a child. Such a picture is designed to allow for the addition of real sequins and beads.

With such a front picture alone, a child would have no guidance for the proper positioning of such sequins or beads.

For this purpose, the rear cloth surface has printed in one color, preferably black, the outline or skeleton of the picture which is portrayed on the front sheet, the artist having in mind the positioning of the real sequins and beads to be applied to the front picture. The rear picture is in exact position as the front picture, registering in substance therewith. The outline of the rear picture has indications thereon to show the localities of the sequins and beads. The indications 15 point out the sequins and the indications 16 point out the beads, all of these being printed, and not the real sequins or beads. A real sequin 15a and a real bead 16a are shown in Fig. 4. The fastening thread is indicated by 15b and 16b, and the real sequins and beads are placed on the front surface of the card 10.

Due to the registration of the front and rear pictures, a child can use its threaded needle and puncture the sheet from the rear, and apply a sequin, for example, at the front and secure it in position. Then the child can follow the same step, for all of the other sequins indicated on the rear or key picture. This can be followed, by the same rear to front piercing of the sheet by the needle for each of the beads indicated at the rear, with the actual beads applied to the front picture. When all the sequins and beads have been applied to the front surface the picture art set or card is complete, and the child is highly gratified with the charming effect produced, conducive towards a desire for repetition with another picture.

The fabric or linen mesh rear surface enables the thread to be secured, and prevents tearing of the front paper layer as would be the case, if the rear fabric layer were not present.

The important feature is this diversity of the materials of front and rear layers, and the pin point registration of the front and rear pictures.

In Figs. 1 and 2, these registered pictures are shown as visible when the sheet or card is turned over to be viewed.

The improved picture art set or card enables children to be engaged in useful, at the same time, in a fascinating pursuit, and enables the inducement of the appreciation of the fine arts in the training and education of the child.

I wish it to be understood that I do not desire to be limited to the exact details of construction shown and described, for obvious modifications will occur to a person skilled in the art.

I claim:

In a picture art set, the combination of an educational card of a front sheet of unperforated paper and a rear sheet of unperforated fabric of close mesh integrally joined together, the front sheet having on its outer surface a complete picture of the matter to be completed by the application of sequins and beads, and the rear sheet having on its rear surface a pin point registration in replica of the said front picture with additional printed indications of the sequins and beads on said rear picture aligned with the exact point where the sequins and beads are to be applied to the front part, showing the exact positions where actual sequins and beads are to be applied by threading to the front surface of the front sheet, and stitching passing through said sheets to hold the actual sequins and beads to the front surface of the paper sheet, in exact accordance with the picture on the rear of the sheet.

ALFRED HAHN.

REFERENCES CITED

The following references are of record in the file of this patent:

UNITED STATES PATENTS

| Number | Name | Date |
|---|---|---|
| 1,067,923 | Jefferson | July 22, 1913 |
| 1,715,420 | Mayer | June 4, 1929 |
| 1,746,588 | Harrison | Feb. 11, 1930 |